2 Sheets—Sheet 1.
H. A. REID,
Assignor, by mesne assignments, to J. W. WHITE, J. C. WHITE, & H. M. LEWIS, Trustees.
Sheep Shearing Machine.
No. 9,455. Reissued Nov. 9, 1880.
Fig. 6,
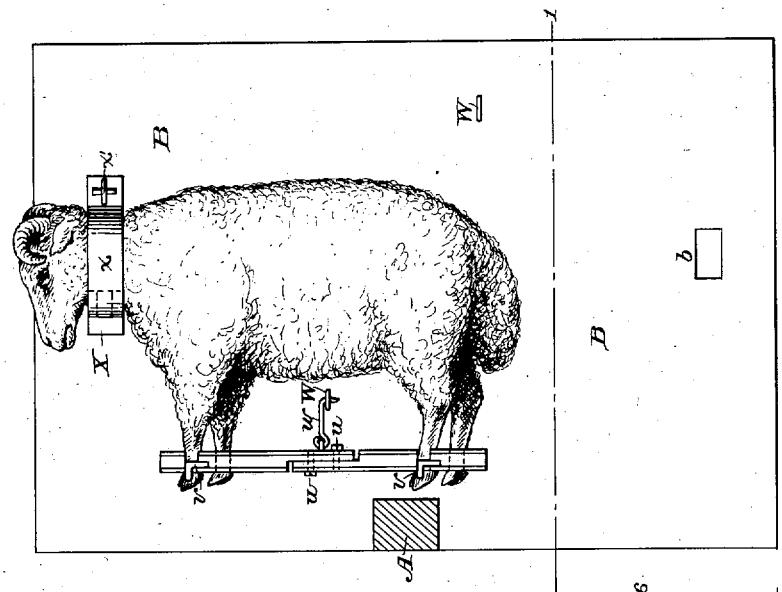
Fig. 1,
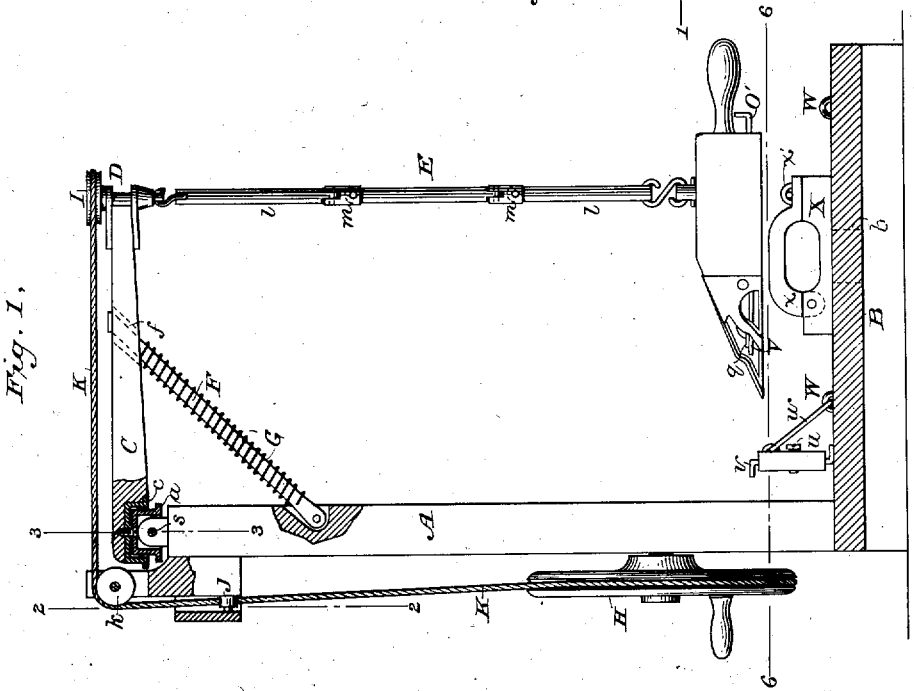
WITNESSES
Wm A. Skinkle.
Geo W. Beck.
INVENTOR
Hiram A. Reid,
By his Attorneys
Baldwin, Hopkins & Peyton.

2 Sheets—Sheet 2.
H. A. REID,
Assignor, by mesne assignments, to J. W. WHITE, J. C. WHITE, & H. M. LEWIS, Trustees.
Sheep Shearing Machine.
No. 9,455. Reissued Nov. 9, 1880.
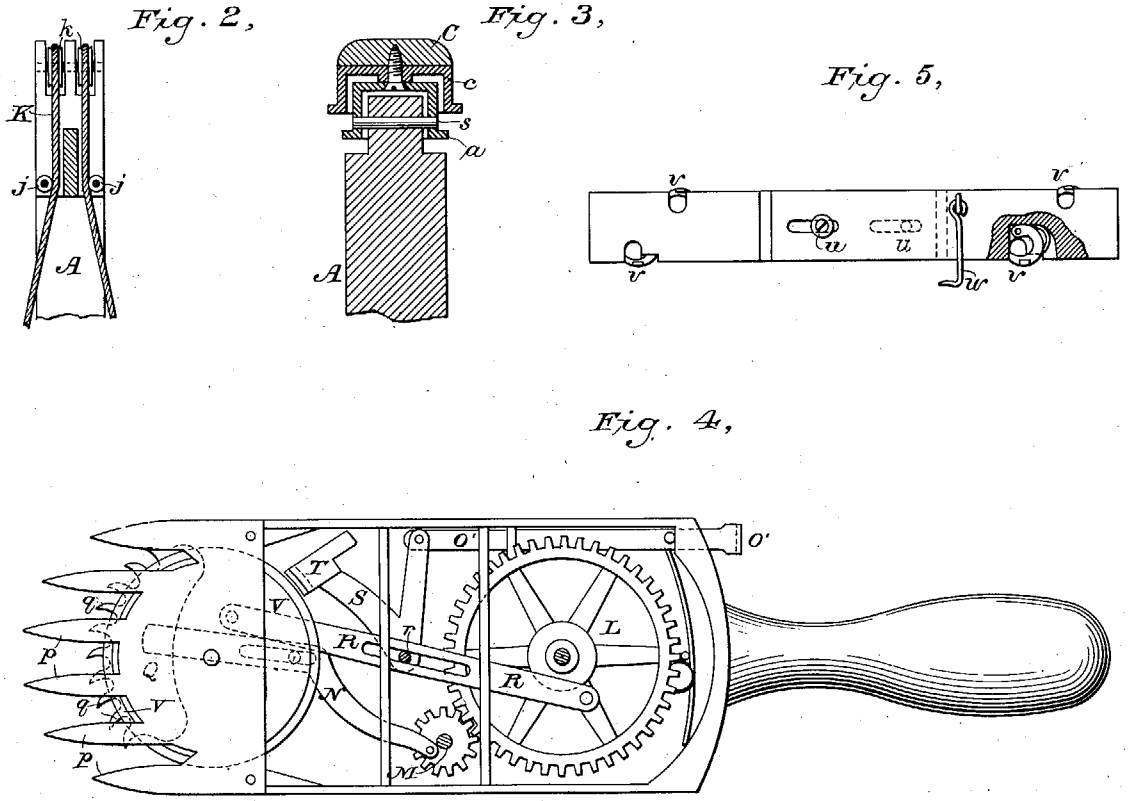
WITNESSES
Wm. A. Skinkle
Geo W. Brock
INVENTOR
Hiram A. Reid,
By his Attorneys
Baldwin, Hopkins & Peyton.

UNITED STATES PATENT OFFICE.

HIRAM A. REID, OF DES MOINES, IOWA, ASSIGNOR, BY MESNE ASSIGNMENT, TO JAMES W. WHITE, J. CLARENCE WHITE, AND H. M. LEWIS, TRUSTEES, OF PHILADELPHIA, PENNSYLVANIA.

SHEEP-SHEARING MACHINE.

SPECIFICATION forming part of Reissued Letters Patent No. 9,455, dated November 9, 1880.

Original No. 81,210, dated August 18, 1868. Application for reissue filed May 29, 1879.

*To all whom it may concern:*

Be it known that I, HIRAM A. REID, formerly of Beaver Dam, in the county of Dodge and State of Wisconsin, but now residing at Des Moines, in the county of Polk and State of Iowa, have invented certain new and useful Improvements in Sheep-Shearing Machines, of which the following is a specification.

My invention consists of certain new combinations of devices, none of which are new when considered by themselves, but which, when combined, as hereinafter described, produce certain new combinations, which are set forth at the close of the specification.

The principal devices of which said combinations are composed are the following, viz: A base or stand provided with a standard, post, or support rising therefrom; a beam or arm provided, near its butt, with two pivotal connections crosswise of each other, so that said beam, when connected with its support, may have the capacity both of vibrating or rocking vertically and of turning or swinging horizontally; a spring acting on said beam to maintain it in a normal position in a vertical plane, and to automatically return it to such position when the strain is removed; a spring acting laterally on said beam to automatically return it to its normal position in a horizontal plane, when the strain by which it has been moved therefrom is removed; a driving-pulley and a driven pulley, with a belt-connection, for transmitting a rapid rotary motion; a spindle carried by the rocking and turning beam or arm, and a flexible shaft which is connected endwise with said spindle and imparts motion to an operating tool or instrument free to be moved about in various directions within certain limits without interfering with the free transmission of the driving power.

In the accompanying drawings, which show all of my improvements as embodied in a machine for the purpose of shearing sheep, organized in the best way known to me at the date of my application for the original patent, Figure 1 is a view, in elevation, partly in section, of my improved machine; Fig. 2, a detail view of the guide-pulleys and guides for the driving-belt connection, which insure the proper working of the belt in whatever position the rocking and turning beam or arm may be; Fig. 3, a detail sectional view through the rocking and turning connection of the beam on the line 3 3 of Fig. 1. Fig. 4 is a detail bottom view of the shearing-comb, showing the interior mechanism of the same. Fig. 5 is a detail view of the leg-stock, and Fig. 6 a plan or top view of the platform or stand, with the standard in section, showing the manner of fastening the sheep.

In the drawings, the base or platform, the standard or support, the rocking or vibrating and turning or swiveling beam or arm, the spring-brace or returning device acting thereon, the driven spindle, the flexible shaft connected therewith, and the driving and driven pulleys and belt connection are shown in Fig. 1.

The construction and operation of these parts of the machine will be described before setting forth the construction and operation of the shearing comb or instrument, to which motion is transmitted for the purpose of shearing sheep.

The standard or support A rises from the platform, base, or stand B, and supports a crane-beam or arm, C, which carries a spindle, D, mounted in bearings in the beam, to which spindle is connected endwise one end of a flexible driving-shaft, E, the outer or free end of which is connected with the instrument to which motion is to be transmitted.

The beam or arm C is given a turning or horizontal movement relatively to the standard A, by means of a circular cap, *c*, affixed to its inner end, which works with easy contact upon a similar cap or bearing, *a*, pivoted on the upper reduced end of the standard or support A, as clearly shown in Figs. 1 and 3, the two caps being connected together, as shown in both of said figures, by a vertical pivot-screw, so as to form a pivoted connection whose axis is the center of the pivot-screw.

The lower cap or bearing is connected by a pivot, *s*, with the upper reduced end of the standard or support, for the purpose of forming a second pivoted connection crosswise of the first, and of permitting the beam or arm to vibrate or rock vertically, so that the instrument carried at the free or outer end of the flexible shaft may be brought to operate at any desired point, or the shearing-comb allowed to follow the contour of the sheep in the operation of shearing, said rocking movement, in addition to the flexure of the shaft and the turning or horizontal movement of the beam, it is obvious, giving the operating-instrument a wide range of movement in various directions without interrupting the free transmission of the driving power.

It will be noticed that the spindle D carried by the arm or beam is arranged in a direction crosswise of the axial line of the pivot *s*, upon which the beam rocks or vibrates vertically, and that consequently the said beam and spindle carried by it can be vibrated in the direction of the length of that spindle and of the flexible shaft connected therewith, which is a valuable and important feature in a machine provided with a turning or horizontally-movable, as well as rocking or vibrating, beam or arm.

It may be well to here state that I am aware that Kennedy's patent of January 30, 1866, shows an arm or beam capable of rocking or vibrating only, in which the spindle carried by the beam is arranged in a direction crosswise of the axial line of the pivots upon which the beam vibrates, so that said beam and spindle vibrate in the direction of the length of said spindle and of the flexible shaft carried by it, and do not claim such construction, broadly, as of my invention.

In order to keep the rocking and turning arm or beam in its normal position, as shown in Fig. 1, and to return it to such position when the rocking or turning strain is removed, I provide a spring-brace acting thereon, consisting of a plate-spring, F, pivoted to the standard A, the upper end of which slides or works in a mortise or opening in the beam or arm, as indicated by the dotted lines at *f*, and of a coiled spring, G, which surrounds the said plate-spring. The force or tension of the springs is exerted to maintain the rocking arm or beam in its normal position, the force of the plate-spring acting to maintain the beam normally against horizontal turning or movement, while the coiled spring acts to maintain the said beam against rocking or vibrating vertically.

It may be well to here state that I am aware that various kinds of coiled springs have heretofore been employed with a rocking beam or head to return it to, and balance or maintain it in, its normal position in a vertical plane, and that weights, &c., have been used for the same purpose, and do not wish to be understood as claiming, broadly, such a device.

The driving power is communicated from a driving-pulley, H, mounted upon the standard A, to a driven pulley, I, mounted upon the spindle D, which is carried by the vertically-rocking and horizontally-turning beam, and with which the flexible shaft is connected, the two pulleys being connected by a driving belt or cord, K, so as to communicate to the driven pulley, its spindle, and the flexible shaft a rapid rotary motion.

In order that the driven or spindle pulley I may be driven directly from the driving-pulley H by means of a single belt, guide-pulleys *k k* are provided intermediate of the driving and driven pulleys and near the upper end of the standard or support A, and guides *j j* are provided to keep the belt in a proper position to work upon the guide-pulleys *k k*, as clearly shown in Figs. 1 and 2, and the two (the guides and guide-pulleys) maintain or preserve the driving-belt in its operating position, no matter in which direction the beam may be vibrated or turned while using the operating-instrument, and constitute a valuable feature in a machine organized with a rocking and turning beam carrying the spindle which is connected with and imparts motion to the flexible driving-shaft.

The flexible shaft shown by me is composed of a series of rods, *l*, connected by any suitable universal joints, such as those shown at *m*.

I am aware that various kinds of flexible shafts, such as universally-jointed rods, coiled-wire shafts, and rigid members or stems connected by a wire-coil helix, have been employed long prior to the date of my original patent, and do not claim such devices as of my invention.

I will now describe, more particularly, the construction of the shearing-comb of my machine and the way it operates.

The lower rod of the outer or free end of the flexible shaft forms the rigid journal or shaft of the rotary toothed wheel L, mounted in the box or casing of the shearing-comb. This wheel L drives the pinion M, which latter operates the hook-plate Q by means of the rod N, which latter is affixed to the plate Q and pivoted to the pinion M. The said rod is slotted and guided by a pin within the slot, as shown in Fig. 4.

The rotation of the pinion moves the hook-plate with a gyratory motion, which is effective in giving the hooks *q*, *q*, &c., of said plate a prehensile movement, which draws the fibers of the wool up to the shearing-wheel V. The shearing-wheel is driven by means of a slotted rod, R, which vibrates on the stud-pin *r*, which pin also serves as a pivot for the bell-crank S, which bears the sharpener T, which latter is composed of two plates of steel or mineral beveled to fit the edge of the shearing-wheel and held in the recessed head of the bell-crank S.

The sharpening-plates can be actuated against the edge of the wheel V at will, for the bell-crank is connected with a rod, O′, which extends beyond the box or frame of the shearing-comb, where it is conveniently accessible to be pressed upon by the thumb when the hand grasps the handle of the instrument.

The front edge of the wheel V and the hooks of the hook-plate operate between the upper and lower plates of the shearing-comb box or casing and their teeth *p p*, &c., as clearly shown in Fig. 1.

The sheep rest upon the platform base or stand with the feet confined in the leg-stock, which consists of two pieces or sections clamped together by means of a slotted halved joint and set-screw, *u*. The feet of the sheep are held in notches by means of latch-hooks *v v v v*, the said latch-hooks being actuated to close over the said notches by any suitable springs, as, for instance, the one shown in Fig. 5. A hasp, *w*, serves to hold the leg-stock attached to the platform by means of the staples W W.

The neck-stock consists of the recessed block X, having the recessed piece *x* hinged thereto. A staple, *x'*, which passes through a slot in said piece *x*, enables said piece to be held to the block X by a key or pin. The said block X has a projection which fits in mortises in the platform or base, as shown at *b* in Figs. 1 and 6.

In shearing sheep with my improved machine, as hereinbefore described, the animal is placed on the platform and one side sheared by passing the comb along the surface of the body, said comb being held in the hand and free to be moved about, as desired. The neck-stock can be shifted to either end of the platform, if desired, when the sheep is turned over on the shorn side to present the other for shearing.

A machine constructed according to my invention is simple, efficient, and desirable, and supplies a want long felt by those interested in wool-growing.

I claim as my invention—

1. The combination, substantially as hereinbefore set forth, of the base, the standard, the horizontally-turning beam, the spindle and its pulley carried by said beam, the flexible shaft connected endwise with said spindle, and the spring operating laterally to return the beam to its normal position in a horizontal direction when the deflecting strain is removed.

2. The combination, substantially as hereinbefore set forth, of the standard, the beam connected with said standard by two pivotal connections crosswise of each other, the spindle carried by said beam, the flexible shaft connected endwise with said spindle, and the springs which return said beam to its normal position when the deflecting strain is removed, whether said strain acts to rock or turn or to both rock and turn said beam.

3. The combination, substantially as hereinbefore set forth, of the shearing-comb casing, the rotary toothed wheel, the pinion driven thereby, the hook-plate actuated by the pinion through the medium of a slotted bar, and the cutting-wheel, driven through the medium of a slotted rod, whereby a rotary motion is given to the cutting-wheel, and a prehensile movement given to the hook-plate, for the purpose described.

HIRAM A. REID.

Witnesses:
C. A. DUDLEY,
J. J. DAVIS.